Jan. 24, 1933. C. R. FISHER 1,895,155
FRUIT PICKER
Filed Oct. 7, 1932
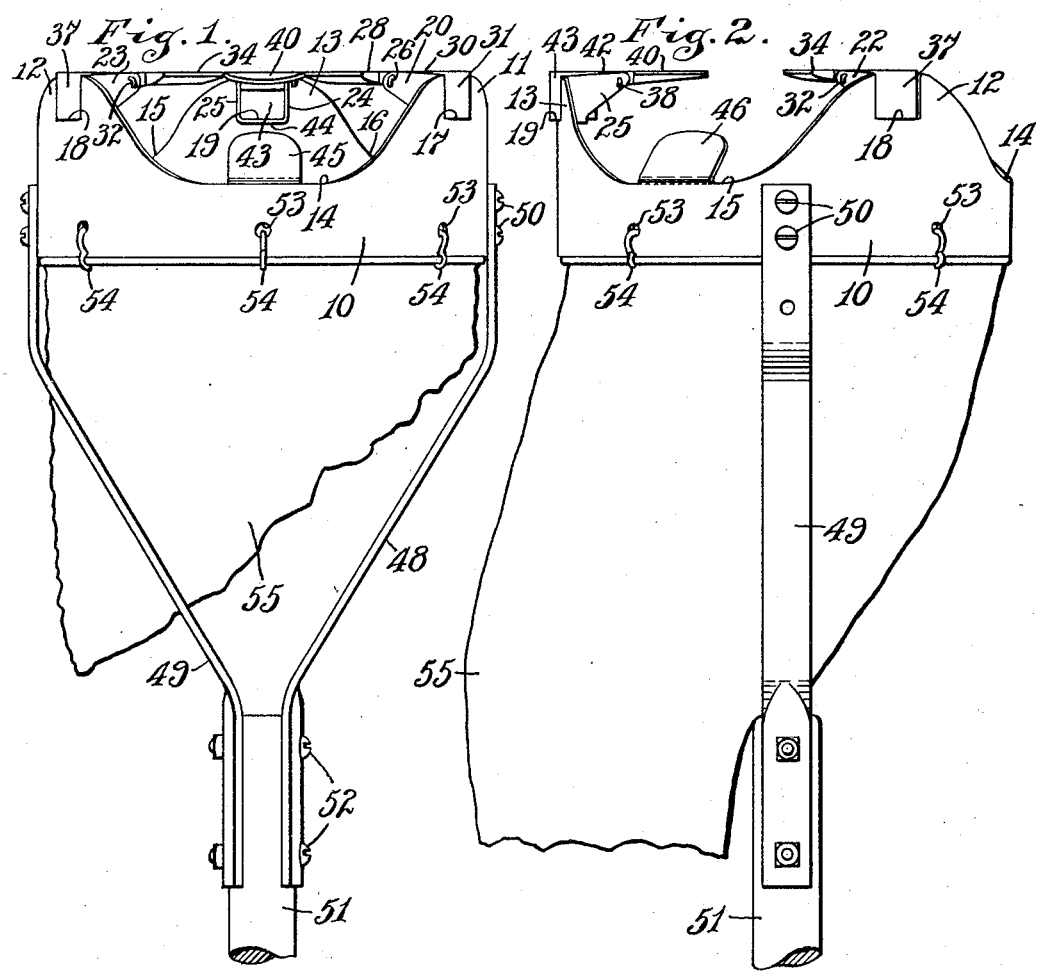
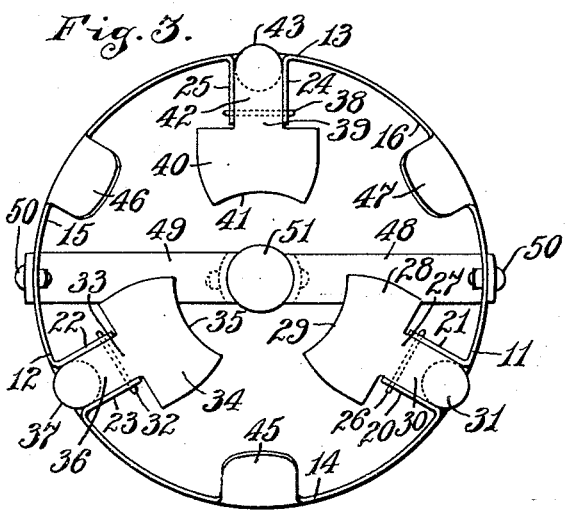
INVENTOR.
Clement R. Fisher,
BY Hood + Hahn.
ATTORNEYS Patented Jan. 24, 1933

1,895,155

UNITED STATES PATENT OFFICE

CLEMENT R. FISHER, OF TERRE HAUTE, INDIANA

FRUIT PICKER

Application filed October 7, 1932. Serial No. 636,625.

The present application relates to a fruit picker, and more particularly to a device adapted for use in picking fruit which grows upon trees at elevations which are too high to permit hand picking while standing on the ground. A primary object of the invention is to provide a device of the character described which shall be capable of removing such fruit from the trees without damaging the fruit, and without requiring skilled manipulation. A further object of the invention is to provide a device of the character described which shall be unusually simple in construction, inexpensive to manufacture, sufficiently sturdy to stand up under the work to which it is to be applied, and very efficient in operation. A further object of the invention is to provide a device of the character described which shall be operable to pick fruit from trees, or the like, without the use of springs, triggers, and other manually actuable operating means. Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, so long as the scope of the appended claims is not violated.

Fig. 1 is a side elevation of a device constructed in accordance with the present invention;

Fig. 2 is an elevation taken substantially at right angles to the plane of Fig. 1; and Fig. 3 is a top plan view.

Referring more particularly to the drawing, it will be seen that I have provided a device comprising an annular sheet metal frame 10 the upper edge of which is undulatory whereby there are provided in such upper edge a plurality of peaks 11, 12, and 13 peripherally spaced and separated by a like number of valleys 14, 15, and 16.

Said peaks 11, 12, and 13 are respectively formed with upwardly opening notches 17, 18, and 19. Associated with the notch 17 and projecting inwardly from the lateral edges thereof are a pair of arms 20 and 21. Similarly associated with the notches 18 and 19 are pairs of arms 22, 23 and 24, 25, respectively.

A pivot pin 26 is mounted in the inner extremity of the arms 20 and 21 and provides a pivotal support for a finger 27. At its inner end, said finger 27 is formed to provide a paddle 28 the inner extremity of which is radiused as at 29. The opposite arm 30 of said finger 27 terminates in a counterweight 31 which, as is clearly illustrated in the drawing, is positioned within the notch 17, so that said weight normally lies in contact with the base of said notch.

A pivot pin 32 is mounted in the inner ends of the arms 22 and 23 and pivotally supports a finger 33 the inner end of which is formed to provide a paddle 34 radiused as at 35 at its inner extremity. The opposite arm 36 of the finger 33 terminates in a counterweight 37 positioned within the notch 18.

A pivot pin 38 extends between the inner extremities of the arms 24 and 25 and forms a pivotal mounting for a finger 39, the inner arm of which is formed to provide a paddle 40 radiused as at 41 at its inner extremity. The opposite arm 42 of said finger 39 terminates in a counterweight 43 positioned within the notch 19.

Preferably, but not necessarily, a portion of the metal displaced from the notches 17, 18, and 19 is bent inwardly to form a horizontal table 44 against which the counterweights 31, 37, and 43 abut.

It will be seen that, when the frame 10 is held with its axis in a substantially vertical position, the counterweights 31, 37, and 43 will hold the fingers 27, 33, and 39 in a substantially horizontal plane.

At the base of the valley 14 the frame 10 is formed with an upwardly and inwardly inclined integral finger 45 which, as will be seen, is positioned between the fingers 27 and 33. Similarly, at the bases of the valleys 15 and 16 the frame is provided with integral fingers 46 and 47, respectively, which are inclined upwardly and inwardly from said frame.

Preferably the frame 10 is mounted upon a pair of straps 48 and 49, being secured to the upper ends thereof by fastening members 50, and said straps 48 and 49 converge downwardly and are secured at their lower ends to a pole 51 through the medium of fastening means 52.

I prefer to provide the frame 10 with a plurality of peripherally spaced apertures 53 in which may be engaged hooks 54 of any desired construction for securing to the bottom edge of the frame a chute 55 of cloth, or the like; said chute extending downwardly and having its lower end disposed within a basket carried upon the hip of the worker. Alternatively, the chute 55 may be replaced by a bag, closed at its lower end; or said chute may have its lower end disposed in a cart or wagon moving along beside the worker.

The fingers 27, 33, and 39 are so positioned, and the radiused portions 29, 35, and 41 are so designed that said radiused portions form spaced arcs of a single circle concentric with the frame 10.

While the manner of use of the herein disclosed invention will undoubtedly be obvious from the above description, the operation of the device is hereinafter briefly discussed.

The pole 51 being of a length sufficient to permit the operator to reach the highest fruit, the operator will move the frame 10 upwardly to encircle one or more fruits. The fruits will enter into the frame, either by depressing the paddles 28, 34, and 40, or some of them, or by entering in the spaces between the fingers 45, 46, and 47 and the adjacent fingers 27, 33, and 39. After the fruits have passed somewhat below the normal plane of the fingers 27, 33, and 39, the counterweights 31, 37, and 43 will return to normal position any of said paddles which have been depressed by the fruit. The fruits are thus entrapped within the frame, and, as the operator now moves his pole and frame downwardly, the fruits will be engaged by the fingers 27, 45, 33, 46, 39, and 47, and will be pulled from the tree, dropping downwardly through the chute 55 into the container prepared for them.

The undulatory shape of the upper edge of the frame 10 permits the use of the device of the present application to pick fruits which grow very close to the branches, since it permits the branches themselves to move into the space below the normal plane of the fingers 27, 33, and 39.

The provision of the fingers 45, 46, and 47 prevents the escape of any entrapped fruit between the fingers 27, 33, and 39, while yet permitting the entry of branches into the space below the plane of the pivoted fingers, and permitting the entry of fruit into the frame from the sides of the frame.

I claim as my invention:

1. A device of the class described, comprising a closed frame, a plurality of counterweighted fingers pivoted on said frame and projecting respectively toward a common center, said fingers being pivoted substantially midway between their ends, and a plurality of other fingers rigid with said frame and positioned in a plane axially spaced below the plane of said pivoted fingers.

2. A device of the class described comprising a closed frame, and a plurality of counterweighted fingers pivoted on the upper end of said frame and normally occupying a substantially horizontal plane when the axis of said frame is vertical, said upper end of said frame being cut away intermediate the pivot points of said fingers to permit penetration of a branch or the like to a point below said horizontal plane.

3. A device of the class described comprising an annular frame, the upper end of said frame being formed with a plurality of peaks projecting above the general plane of said frame end, and a plurality of fingers, one of said fingers being pivoted on each of said peaks.

4. A device of the class described comprising an annular frame, the upper end of said frame being formed with a plurality of peaks projecting above the general plane of said frame end, a plurality of fingers, one of said fingers being pivoted on each of said peaks, and a plurality of other fingers, each positioned intermediate a pair of pivoted fingers, and rigidly carried on said frame.

5. A device of the class described, comprising an annular frame, the upper end of said frame being provided with a plurality of peripherally spaced peaks projecting above the general plane of said frame end, a plurality of fingers, one of said fingers being pivoted on each of said peaks and all of said fingers projecting substantially radially inward, and a plurality of other fingers rigidly carried on said frame and projecting upward and inward from said frame end, each of said last-named fingers being positioned between a pair of said pivoted fingers.

6. A device of the class described comprising a sheet-metal annular frame, the upper edge of said frame being undulatory to provide a plurality of peripherally spaced peaks, a notch at the apex of each of said peaks, a pair of spaced arms projecting inwardly at the edges of each of said notches, a plurality of counterweighted fingers, and means cooperating with each of said pairs of arms to mount a finger pivotally therebetween.

7. A device of the class described comprising a sheet-metal annular frame, the upper edge of said frame being undulatory to provide a plurality of peripherally spaced peaks, separated by a like number of valleys, a notch at the apex of each of said peaks, a pair of spaced arms projecting inwardly at the edges of each of said notches, a plurality of counterweighted fingers, means cooperating with each of said pairs of arms to mount a finger pivotally therebetween, and a plurality of other fingers, each integral with said frame, and each projecting upwardly and inwardly from the base of one of said valleys.

8. A device of the class described comprising a sheet-metal annular frame, the upper edge of said frame being undulatory to provide a plurality of peripherally spaced peaks, a notch at the apex of each of said peaks, a pair of spaced arms projecting inwardly at the edges of each of said notches, a plurality of fingers, each comprising a fruit-engaging arm and a counterweighted arm, and means cooperating with each of said pairs of spaced arms to mount a finger pivotally therebetween with its fruit-engaging arm cooperatively associated with the corresponding arms of the remaining fingers, and with its counterweighted arm received within its corresponding frame notch.

9. A device of the class described, comprising a sheet-metal frame, the upper edge of said frame being undulatory to provide a plurality of peripherally spaced peaks separated by a like number of valleys, a notch at the apex of each of said peaks, a pair of spaced arms projecting inwardly at the edges of said notches, a plurality of fingers, each comprising a fruit-engaging arm and a counterweighted arm, and means cooperating with each of said pairs of spaced arms to mount a finger pivotally therebetween with its fruit-engaging arm cooperatively associated with the corresponding arms of the remaining fingers, and with its counterweighted arm received within its corresponding frame notch.

10. A device of the class described comprising a closed frame and a plurality of fingers pivotally mounted on said frame and projecting toward a common center, each of said fingers comprising a peripherally broadened paddle having a radiused inner edge, and said paddles being spaced from each other but so associated that their respective edges form spaced arcs of a single circle struck about said common center.

In witness whereof, I have hereunto set my hand at Indianapolis, Indiana, this 5th day of October, A. D. one thousand nine hundred and thirty-two.

CLEMENT R. FISHER.